United States Patent [19]

Holzknecht

[11] Patent Number: 4,487,707

[45] Date of Patent: Dec. 11, 1984

[54] REFRIGERATION LEAK SEALANT AND METHOD

[76] Inventor: Robert H. Holzknecht, 234 King St., Cocoa, Fla. 32922

[21] Appl. No.: 532,747

[22] Filed: Sep. 16, 1983

[51] Int. Cl.³ .......................... C09K 3/12; F25B 43/00
[52] U.S. Cl. ........................................ 252/68; 252/72; 252/8.5 M; 252/8.5 LC; 62/114; 62/298; 62/468; 62/474; 106/33
[58] Field of Search ......... 252/68, 72, 8.5 M, 8.5 LC; 62/114, 298, 468, 474; 106/33

[56] References Cited

U.S. PATENT DOCUMENTS

| 2,732,074 | 1/1956 | Kuthe | 62/474 |
| 3,644,208 | 2/1972 | Krueger | 252/72 |
| 3,692,549 | 9/1972 | Martin | 106/33 |
| 3,984,339 | 10/1976 | Takeo et al. | 252/72 |
| 4,072,615 | 2/1978 | McConnell | 62/474 |
| 4,109,487 | 8/1978 | Carr | 62/474 |

Primary Examiner—Paul Lieberman
Assistant Examiner—Robert A. Wax
Attorney, Agent, or Firm—Duckworth, Allen, Dyer & Pettis

[57] ABSTRACT

A stop leak composition for sealing leaks in refrigeration systems and method for using same. A mixture of smooth surfaced particles having a size small relative to the leak size is suspended in refrigeration oil and injected into the refrigerant circuit of a system. The particles will be forced into small leaks and will agglomerate to seal the leak. Graphite particles and Teflon ® particles in size ranges from 20 microns to 65 mesh are suitable.

11 Claims, 3 Drawing Figures

REFRIGERATION LEAK SEALANT AND METHOD

BACKGROUND OF THE INVENTION

1. Field of the Invention

The present invention relates to a leak sealing composition for refrigeration systems, and more particularly to a composition and method for repairing air conditioners using Freon ® and refrigerators without replacement of parts.

2. Brief Description of the Prior Art

The use of refrigeration systems using Freon ® is now universal in the United States for automobile air conditioning, home refrigerators, home freezers, and building air conditioners. As is well known, such systems are sealed and circulate the Freon ® refrigerant by means of a compressor. Although every practical effort is made by the manufacturer to provide a leak-proof system, this is not practical. No joints are perfect, and the materials used in the system have a leakage factor. Leakage is also two-way; Freon ® leaks out and air leaks in.

Although generally minute, some infiltration occurs through hose walls. Seals in the compressor permit a small leakage, and the joints are also trouble spots. Fortunately, these small leaks do not cause failure of the system and, if no other problems occur, the system may operate for several years. However, problems arise when water vapor leaks into the system. When this happens, the water reacts chemically with the Freon ® to form various acids, such as hydrochloric acid. The acid circulates with the refrigerant and can, of course, damage metal parts of the system. The evaporator is especially vulnerable for two reasons; its walls are very thin, and once the acid droplets enter, they are trapped due to their inability to evaporate. The drops separate from the Freon ® and begin to corrode the inner surfaces of the evaporator core.

When a hole forms through the evaporator wall, excessive loss of Freon ® occurs and rapid loss of efficiency or complete failure of the system can result.

Some air conditioners are more prone to this problem than others. For example, in the automobile air conditioning industry, the evaporators in General Motors automobiles began to fail at an abnormally high rate in the 1977 model year. The problem turned out to be acid-caused pinholes through the aluminum walls. As a result of this problem, a rebuilding industry developed in which replaced evaporator cores were reworked and the leaks repaired using a variety of techniques. Some rebuilders patch leaks by embedding the lower portions of the core in epoxy, while others coat the interior surfaces with a very thin epoxy coat. Liquid rubber and fiberglass have also been used. Regardless of the method of rebuilding, the cost to the consumer to have an evaporator replaced is quite high. When leaks occur in refrigerators and freezers, it is usually impractical to replace or repair due to the location of the failed elements within the cabinet walls.

Thus, there is a long felt need for a leak sealing material and method that can repair pinhole leaks and the like in refrigeration systems without replacing components.

Leak sealing compositions have been known in the prior art for automobile cooling systems. For example, U.S. Pat. No. 3,630,914 to Noukee et al teaches the use of cross-linked polyacrylamide particles in the range of 50 mesh to 200 mesh added to the coolant. The particles tend to swell in the presence of water and to thereby stop leaks. Martin, in U.S. Pat. No. 3,692,549, utilizes flax mixed with graphite and aluminum powder, although he notes powdered iron, magnesium, calcium, manganese, or copper may be used. This composition is suitable for stopping leaks in aqueous solutions. U.S. Pat. No. 3,984,339 to Takeo, et al shows the use of cellulose particles in electrical insulating oil for stopping leaks internally in oil cooling systems. However, none of these compositions are suitable for injecting into the Freon ® circuit of a refrigeration system.

SUMMARY OF THE INVENTION

We have found that a mixture of powders having particle sizes ranging from 325 microns to 65 mesh when suspended in pure refrigeration mineral oil is effective for injecting into the Freon ® circuit of a refrigerator or air conditioner to internally seal pinhole leaks, cracks in metal joints or components, and voids in gaskets or O-ring joints. We have determined that a mixture of one part graphite particles, one part Teflon ® particles, and five parts mineral oil is eminently satisfactory although other ratios and materials are also suitable.

It is, therefore, a principal object of our invention to provide a composition and method for sealing leaks internally in refrigeration Freon ® circuits.

It is another object of our invention to provide a method for repairing air conditioners and refrigerators using Freon ® without replacement of parts.

It is still another object of our invention to provide a method for treating air conditioning and refrigeration systems at manufacture to extend the life of such systems.

These and other objects and advantages of our invention will become apparent from the following detailed description and the drawings.

DETAILED DESCRIPTION OF THE PREFERRED EMBODIMENT

Figure 1:
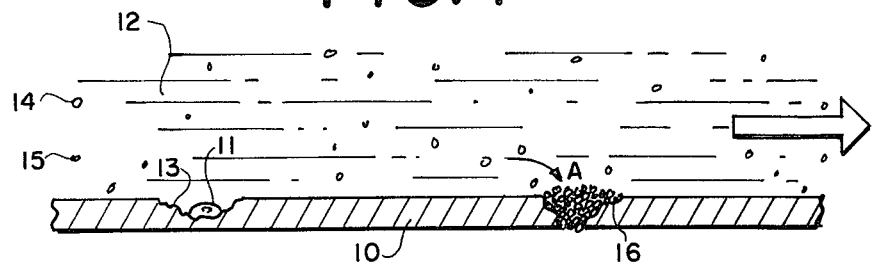
FIG. 1 shows a partial cross sectional view of the wall of an evaporator having Freon ® flowing therealong in which the composition of the invention is included.

Turning first to FIG. 1, a partial view in cross section of a wall 10 of an evaporator in a typical refrigeration or air conditioning system is shown. Typically, wall 10 is made from aluminum alloy or the like. Flowing in the device will be a refrigerant 12, commonly Freon ®, which is assumed to be flowing in the direction of the solid arrow. Where the device is an evaporator, the refrigerant may occur in both the liquid phase and the gaseous phase. In any event, the normal lubricating oil is carried along with the refrigerant 12. In accordance with our invention, we add a small amount of the inventive composition which may be a mixture of one part graphite particles, one part Teflon ® particles, and five parts mineral oil. We have found the effective particle sizes in accordance with the invention to be from 325 microns to 65 mesh. The amount of the mixture required is a function of the size of the refrigeration system; from one ounce to five ounces is a typical range to be added to the refrigerant.

In FIG. 1, a pitted area 13 may be seen which may be caused by the precipitation of acid formed between moisture which is inevitably found in refrigeration systems and the Freon ®. Acid drop 11 is seen to have condensed in pit 13. As will be understood, the action of the acid on the metal of wall 10 will continue until a pinhole occurs as shown for pit 16. In accordance with the invention, a pinhole at the bottom of pit 16 will result in a leak of the refrigerant 12 which is under pressure in the system. Advantageously, particles 14 and 15 of the invention will tend to be forced out through the pinhole by the internal pressure. We have found experimentally that particles 14 and 15 will agglomerate and under continued pressure will agglutinate to fill the pinhole, thereby preventing further leakage of the refrigerant 12. The range of sizes of the particles specified ensures that a pinhole or other small leak will trap suitable size particles to effect a seal.

We have found experimentally that holes in metal components up to about 0.015 inch in diameter are successfully sealed with the compound of the invention as well as cracks in metal components or in fused joints up to about 0.008 inch in width. Similarly, voids in gasketed or O-ring type joints up to about 0.008 inch can be successfully sealed.

Particles of polytetrafluorethylene available from Custom Compounding, Inc. under the name Polylube ® are satisfactory in our compounds. For example, a grade 34 provides elongated particles in the range of 20 to 50 microns. Graphite particles are available from Asbury Graphite Mills, Inc. We have determined that a mixture of Grade #A-60 and 4110 artificial is effective for the purposes of our invention. Grade #A-60 is about 99.7% carbon, having particle sizes in the range of +200 mesh to −325 mesh. 4110 artificial is 99.3% carbon in a range from +140 mesh to +200 mesh with 15.4% pan.

Although we have specified above a mixture of one part graphite, one part Teflon ®, and five parts oil, we have found that these ratios can be varied widely without loss of effectiveness of the action and efficiency of the compound. For example, tests have shown that graphite particles alone suspended in refrigeration oil are effective as a leak sealant. Investigation of many different powders and particles has revealed that any smooth particles within the size range of 20 microns to 65 mesh which are non-abrasive and have a self-lubricating property are satisfactory and are therefore considered to fall within the scope of our invention.

Surprisingly, the sealant of the invention is selective and seals only unwanted leaks. No clogging of functional internal passages or orifices has been noted It is believed that such orifices are generally larger than a size which will permit agglomeration of the particles. Also, such orifices or passages are machined to be smooth surfaced, and due to the self-lubricating characteristic of the particles, no tendency to collect seems to occur.

Figure 2:
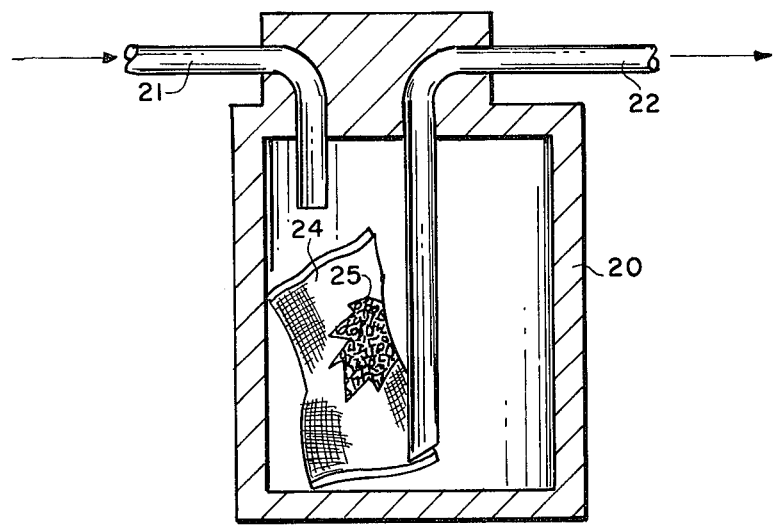
FIG. 2 is a simplified cross section of a dryer suitable for use in automobile air conditioning systems utilizing our invention.

Most refrigeration and air conditioning systems use dryers in the circuit to remove residual moisture and to collect moisture which may leak into the system. Such dryers generally cause the refrigerant to flow through a desiccant material. We have found that the particles of the invention may collect and therefore be removed from circulation by such desiccants. To minimize such occurrence, we prefer to replace the dryer in a system being treated with our sealant compound with a specially designed dryer. In FIG. 2, the cross section of a dryer suitable for an automobile air conditioner is shown. Seen in cross section is the normal dryer chamber 20 which normally holds the desiccant. However, in this instance, the desiccant 25 is stored in a permeable bag 24 shown cut-away to expose the desiccant 25. Thus, the oil bearing the particles 14 and 15 is not forced to flow through the desiccant but which is still effective to absorb any moisture through the bag 24.

Figure 3:
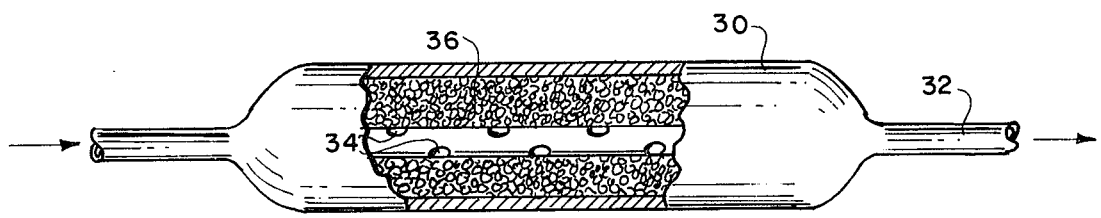
FIG. 3 is a partially cut-away view of a dryer suitable for use in refrigeration systems incorporating our invention.

Most refrigerators and freezers utilize a dryer formed from an enlarged tubing section in the refrigerant line with the desiccant stored within the enlarged section. FIG. 3 shows a dryer suitable for use with our invention in which the refrigerant line 32 is continuous and extends concentric with the enlarged tubing section 30 with the desiccant 36 stored in the space between the refrigerant line 32 and the tubing section 30. A group of holes 34 in the refrigerant line which may be on the order of 0.03 inch diameter is provided which permits moisture vapor to be absorbed by the desiccant crystals 36 as the refrigerant flows through line 32. Since the oil bearing the sealant particles is not required to flow through the desiccant, loss of such particles is minimized.

TEST RESULTS

A number of tests have been performed to establish the optimum sealant materials and method of application, and to determine the effectiveness of our sealant materials. A simulator suitable for testing automotive air conditioning components was constructed by assembling a complete bench system into which leaky elements could be installed and in which a wide range of operating parameters could be simulated. After optimization with the simulator, tests were conducted on actual automobiles and refrigeration systems. The following tests were used to verify the results of optimization.

TEST NO. 1

Eight different leaky General Motors Model 6259 evaporators were tested. Each was treated with 2 ounces of 525 VIS refrigeration oil having 1.5 parts #A-60 graphite particles and 1.5 parts 4110 particles mixed therewith. Each evaporator was first operated in the simulator for 30 minutes and leaks identified. Leaks varied from small to medium. After injection of the sealant, all leaks were sealed and operated for 30 hours without failure. A hole was punched in one unit with an 0.027 inch needle. The resulting leak failed to seal properly.

TEST NO. 2

Eight automobile air conditioners having leaks of unknown size range in automobiles were treated. Seven of the automobiles were General Motors models and one was a Chrysler Motors model. The sealant was composed of 1.5 parts #A-60 graphite particles, 1.5 parts 4110 particles, and 5 parts 525 VIS refrigeration oil. Two ounces of the sealant were added to the refrigerant. The leaks all sealed after addition of the sealant. The automobiles were operated over periods ranging from one month to five months with no recurrence of leaks.

TEST NO. 3

Nine Chrysler Model 849 evaporators having leaks ranging in size from small to extra large were tested on the simulator. The extra large leaks were evidenced by hissing of refrigerant. Two ounces of sealant having 1 part 4110 particles, 0.5 part F-5A graphite particles, and 5 parts 525 VIS refrigeration oil was added to each system. All of the small, medium, and large leaks sealed satisfactorily. The extra large (hissing) leaks failed to seal.

TEST NO. 4

Beginning in November, 1982 and continuing through the filing date of this patent application, 8 domestic refrigerator units (1 freezer and 7 over-under refrigerators) were each treated with two ounces of sealant having 1.5 parts #A-60 graphite particles, 1.5 parts 4110 particles, and 5 parts 525 VIS refrigeration oil. Seven units had leaking evaporators, and one unit had a connecting condenser tube leak. All leaks were sealed, and no indication of further leaks has been noted to date. The compressor failed in one unit and was replaced. This unit is still operating as of the filing of this application. This testing was performed by Alfred S. Logsdon, Air Conditioning and Refrigeration Instructor at Brevard Community College, Cocoa, Fla. The 8 units used were to be scrapped out for reusable parts before repair of the leaks but have been placed back in service.

As is shown by these and other continuing successful tests of the sealant and method of the invention, we have provided a low-cost compound which is effective in sealing a range of refrigerant leaks from small to large without replacement of leaking components. We have found that the ratios of particles is not critical. For example, the ratio of particles may range from 1 to 6 parts in 10 parts of refrigerant oil. Graphite and Teflon ® particles are particularly effective due to their smooth surfaces and inherent lubricating qualities. The ratio of Teflon ® particles added to the graphite particles may range from zero to 1.5 without degrading the sealing action. Other smooth surfaced particles are also suitable, such as magnesium aluminum sulfate, and zinc oxide.

Although the method and sealant composition have been described herein with particularity, it will be obvious to those of skill in the art to make various changes and substitutions without departing from the spirit or scope of the invention.

I claim:

1. A stop leak composition for stopping a leak in refrigeration systems having a refrigerant comprising: mineral oil compatible with the refrigerant; and
a mixture of smooth surfaced particles having sizes small relative to the size of the leak, said mixture suspended in said mineral oil wherein the ratio of said particles selected from the group consisting of graphite, polytetrafluoroethylene, magnesium, aluminum sulfate, zinc oxide and mixtures thereof to said mineral oil is within the ratio of about 1:10 to 6:10.

2. The composition as defined in claim 1 in which said mixture of particles is a mixture of graphite and polytetrafluoroethylene.

3. The composition as defined in claim 2 in which said composition has a polytetrafluoroethylene-to-mineral oil ratio of up to about 1.5:5.

4. In a refrigeration system having a refrigerant, the leak proofing system comprising:
    a dryer having means for passing said refrigerant therethrough;
    dessicant holding means disposed within said dryer, including a dessicant for absorbing moisture from said refrigerant, said holding means adapted to isolate said dessicant from contact with said refrigerant; and
    refrigeration oil having suspended therein a mixture of smooth surfaced particles selected from the group consisting of graphite, polytetrafluoroethylene, magnesium, aluminum sulfate, zinc oxide and mixtures thereof having sizes in the range of about 20 microns to 65 mesh, said refrigerant oil and said mixture being mixed with said refrigerant.

5. The system as defined in claim 4 in which the amount of said refrigeration oil is in the range of one ounce to five ounces.

6. The system as defined in claim 4 in which said dryer comprises:
    a closed chamber having an inlet and an outlet; and
    said dessicant holding means includes a permeable bag disposed within said chamber.

7. The system as defined in claim 4 in which said dryer comprises:
    a tube for carrying said refrigerant; and
    a chamber essentially coaxial with said tube, said chamber acting as said dessicant holding means, said tube having a plurality of holes through the walls thereof communicating with said chamber.

8. A method for leak proofing and for sealing small leaks in refrigeration systems comprising the steps of:
    a. mixing smooth surfaced particles selected from the group consisting of graphite, polytetrafluoroethylene, magnesium, aluminum sulfate, zinc oxide and mixtures thereof having sizes small relative to the leak size;
    b. suspending the mixed particles in mineral oil compatible with the refrigerant; and
    c. injecting the mineral oil and suspended particles into the refrigerant circuit of the system.

9. The method as defined in claim 8 which includes the further step of providing a dryer in the system having a passage for the refrigerant isolated from and in communication with a dessicant.

10. The method as defined in claim 8 in which said mixing step includes the step of selecting such particles having sizes in the range of 20 microns to 65 mesh.

11. The method as defined in claim 8 in which said injection step includes injection of an amount of mineral oil and suspended particles in the range of one ounce to five ounces.

* * * * *